(12) United States Patent
Roe et al.

(10) Patent No.: US 10,329,007 B2
(45) Date of Patent: Jun. 25, 2019

(54) ENVIRONMENTAL ENCLOSURE

(71) Applicant: Bell Helicopter Textron Inc., Fort Worth, TX (US)

(72) Inventors: Jayson David Roe, Hurst, TX (US); Ellen Slack Lindeman, Hurst, TX (US); Stanley Kirk Bradford, Denton, TX (US); Philip John Hannan, Weatherford, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 0 days.

(21) Appl. No.: 15/687,788

(22) Filed: Aug. 28, 2017

(65) Prior Publication Data

US 2019/0061904 A1 Feb. 28, 2019

(51) Int. Cl.
| | | |
|---|---|---|
| *H02G 3/08* | (2006.01) | |
| *B64C 1/40* | (2006.01) | |
| *B64C 27/04* | (2006.01) | |
| *B60R 16/023* | (2006.01) | |
| *B60R 16/08* | (2006.01) | |
| *B64C 13/50* | (2006.01) | |

(52) U.S. Cl.
CPC .......... *B64C 1/406* (2013.01); *B60R 16/0239* (2013.01); *B60R 16/08* (2013.01); *B64C 27/04* (2013.01); *B64C 13/503* (2013.01); *H02G 3/08* (2013.01)

(58) Field of Classification Search
CPC ............ H02G 3/08; H02G 3/081; H02G 3/14; H05K 5/00; H05K 5/02; H05K 5/04; H05K 5/004; H01R 13/46; H01R 13/52; H01R 13/5213; H01R 13/527; H01R 13/53; H01R 13/533; B64C 1/406; B64C 27/04; B64C 13/503; B60R 16/0239; B60R 16/0238
USPC ......... 174/480, 481, 50, 53, 57, 58, 37, 490, 174/482; 220/3.2–3.9, 4.02; 439/76.1, 439/76.2; 361/600, 601
See application file for complete search history.

(56) References Cited

U.S. PATENT DOCUMENTS

| | | | | |
|---|---|---|---|---|
| 4,721,476 A * | 1/1988 | Zeliff | ..................... | H02G 3/185 174/489 |
| 7,205,488 B2 * | 4/2007 | Riner | ..................... | H02G 3/185 174/481 |
| 7,968,806 B2 * | 6/2011 | Shelton | ................ | H05K 5/0013 174/50 |
| 7,989,710 B2 * | 8/2011 | Hansen | .................. | H02G 3/185 174/482 |
| 8,471,145 B2 * | 6/2013 | Suzuki | .................... | H02S 40/34 174/50 |

(Continued)

*Primary Examiner* — Angel R Estrada
(74) *Attorney, Agent, or Firm* — Slater Matsil, LLP

(57) ABSTRACT

An enclosure including a bottom side having a pass through opening, a connector surface having one or more connector openings, a first side adjacent to the connector surface, and a second side having at least a portion of an access opening, where the first side, the second side, the connector surface and the bottom side bound an interior cavity. The enclosure further includes one or more connectors, each of the one or more connectors disposed in a respective connector opening of the one or more connector openings and extending from the interior cavity, through the connector surface, and a cover attached to an exterior surface of at least the second side, the cover covering the access opening.

20 Claims, 17 Drawing Sheets

(56) References Cited

U.S. PATENT DOCUMENTS

| | | | | |
|---|---|---|---|---|
| 8,476,540 B2* | 7/2013 | Dahl | ............ | H02G 3/088 174/50 |
| 8,519,276 B2* | 8/2013 | Isaacks | ............ | H02G 3/185 174/486 |
| 8,962,997 B2* | 2/2015 | Conway | ............ | H02G 3/08 174/481 |
| 9,035,182 B2* | 5/2015 | Scanzillo | ............ | H02G 3/14 174/482 |

* cited by examiner

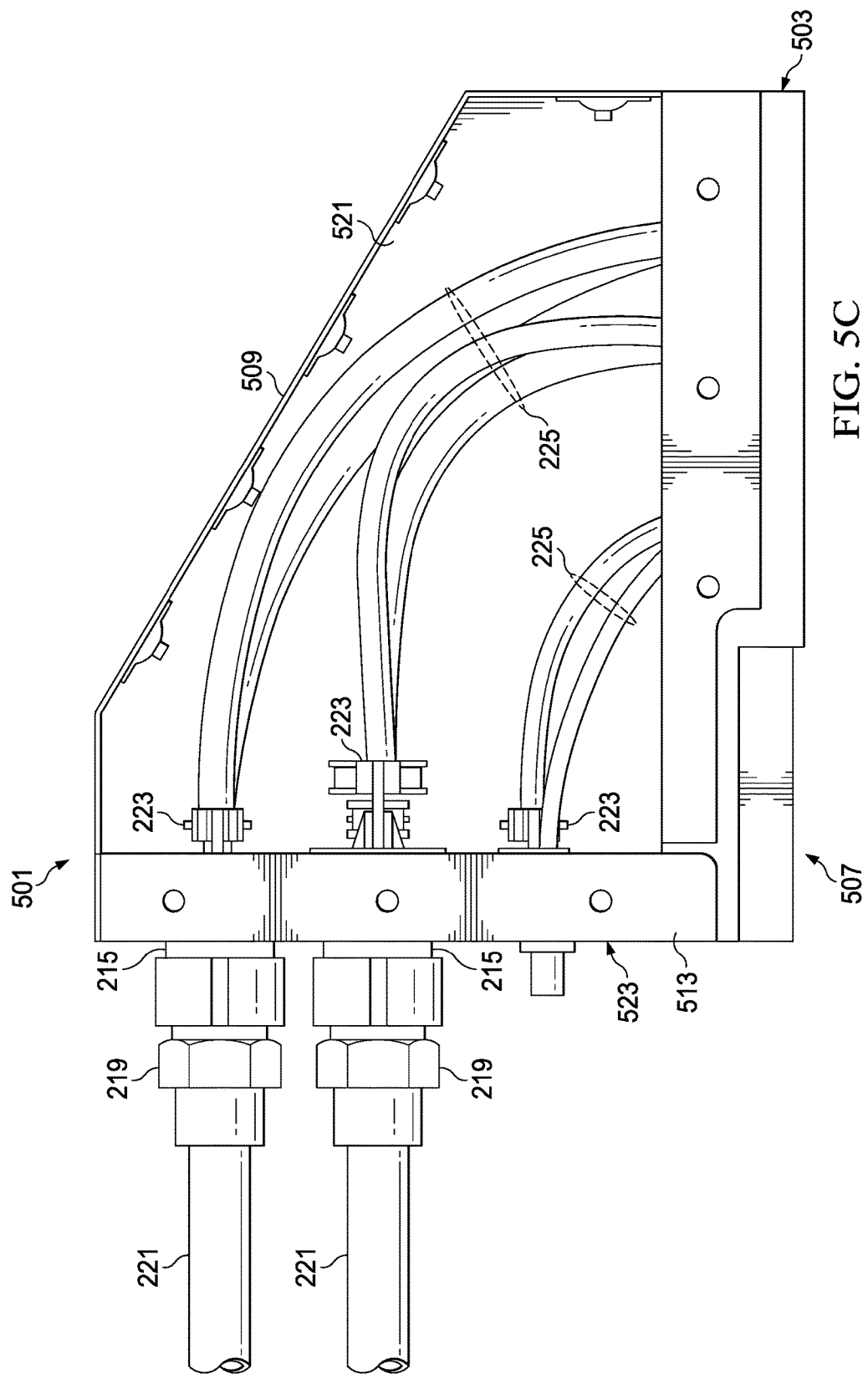

ENVIRONMENTAL ENCLOSURE

TECHNICAL FIELD

The present invention relates generally to a system and method protecting system control connections, and, in particular embodiments, to a system and method for providing an enclosure to protect electrical, hydraulic, pneumatic, and other types of connections in a vehicle at the point at which the connections pass through a wall of the vehicle.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload

SUMMARY

An enclosure according to an embodiment includes a bottom side having a pass through opening, a connector surface having one or more connector openings, a first side adjacent to the connector surface, and a second side having at least a portion of an access opening, where the first side, the second side, the connector surface and the bottom side bound an interior cavity. The enclosure further includes one or more connectors, each of the one or more connectors disposed in a respective connector opening of the one or more connector openings and extending from the interior cavity, through the connector surface, and a cover attached to an exterior surface of at least the second side, the cover covering the access opening.

An embodiment rotorcraft includes a mounting surface having a shell opening disposed therein, and an enclosure disposed on the mounting surface, the enclosure having a plurality of sides and further having a first connector surface extending away from the mounting surface, with the plurality of sides and the first connector surface bounding an interior cavity of the enclosure disposed over the shell opening, and where the first connector surface has a first connector opening. A first connector is disposed in the first connector opening and extends from the interior cavity through the first connector surface, and a first internal line is connected to an interior portion of the first connector and extending through the shell opening. A first external line connected to an external portion of the first connector.

An embodiment method includes providing an enclosure having a bottom side with a pass through opening, the enclosure further having a connector surface with a connector opening, the enclosure further having a first side adjacent to the connector surface and a second side. The first side, the second side, the connector surface and the bottom side bound an interior cavity of the enclosure. The method further includes securing the enclosure over a shell opening disposed in a mounting surface of a vehicle, where the interior cavity is adjacent to the shell opening after the enclosure is secured over the shell opening, and where the connector surface extends away from the mounting surface after the enclosure is secured over the shell opening. The method further includes affixing a harness to the enclosure such that an internal line of the harness passes through the shell opening to into the interior cavity of the enclosure, where, after affixing the harness, the internal line is attached to an interior portion of a connector that is disposed in the connector opening and that extends from the interior cavity through the connector surface, and affixing an external line to an exterior portion of the connector.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5A through 5D illustrate views of an enclosure assembled from multiple body portions according to some embodiments;

DETAILED DESCRIPTION OF ILLUSTRATIVE EMBODIMENTS

Figure 1:
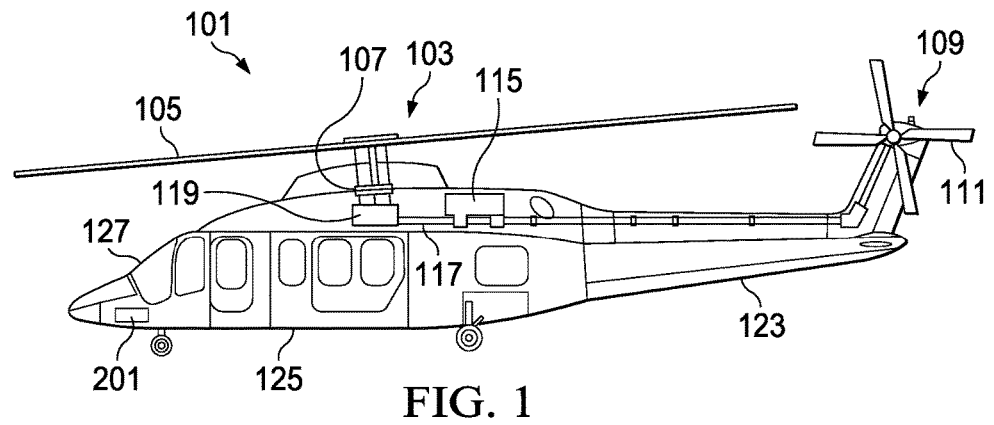
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

Many vehicles have an enclosed compartment that houses a passenger area, controls, and one or more computer systems. An outer shell or skin encloses the compartment, and systems such as engines, rotors, control surfaces, and the like are disposed outside of the outer skin. A FBW system requires more electrical wiring than a purely mechanical control system or an electrically assisted control system. Electrical wiring connected to interior computer systems, controls or the like passes through the skin to connect the interior systems to for example, engines, external sensors, swashplate or tail rotor controls, landing gear controls, or the like. Additionally, fluid transfer, hydraulic, or pneumatic systems may also pass through the outer skin of the skin of the rotorcraft to connect hydraulic actuators, fuel cells, engines, or the like to systems inside the rotorcraft.

Embodiments of the system and method described herein are directed to providing an enclosure for mounting connectors for electrical, fluid, pneumatic, or other pass through systems in a position where fluids tend to flow away from the connectors. In some embodiments, the enclosures may cover and enclose an opening in the outer skin of a rotorcraft. Connectors may be mounted on, and pass through, a connector surface that is a surface of the enclosure substantially perpendicular to the surface of the outer skin having the opening. The connectors are mounted on a side of the enclosure to permit the orientation of the connectors to be different than the mounting surface. Thus, the enclosure may cover an opening passing vertically through a horizontal surface and allow the connectors to be mounted horizontally with the connectors passing through a vertical connector surface of the enclosure. Mounting the connectors horizontally permits hoses, wires, cables, or the like, that are attached to the connectors to approach the enclosure horizontally as well. The horizontal approach of a cable to the enclosure creates a drip point or drip loop where liquid running down the cable will drip off of a low point of the cable without collecting at the connector. The drip loop feature may be further enhanced by a connector surface that is angled downward, so that the connector points slightly toward from the mounting surface. This causes the connected cable to approach the enclosure in a slightly upward direction. Thus, a line attached to a connector has a low point forming a drip loop that is spaced apart from the connector. This enhances the cable's ability to shed water at the drip loop since fluids on the cable would have to run upwards, against gravity, toward the connector. The angled connector surface and cable arrangement FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2A:
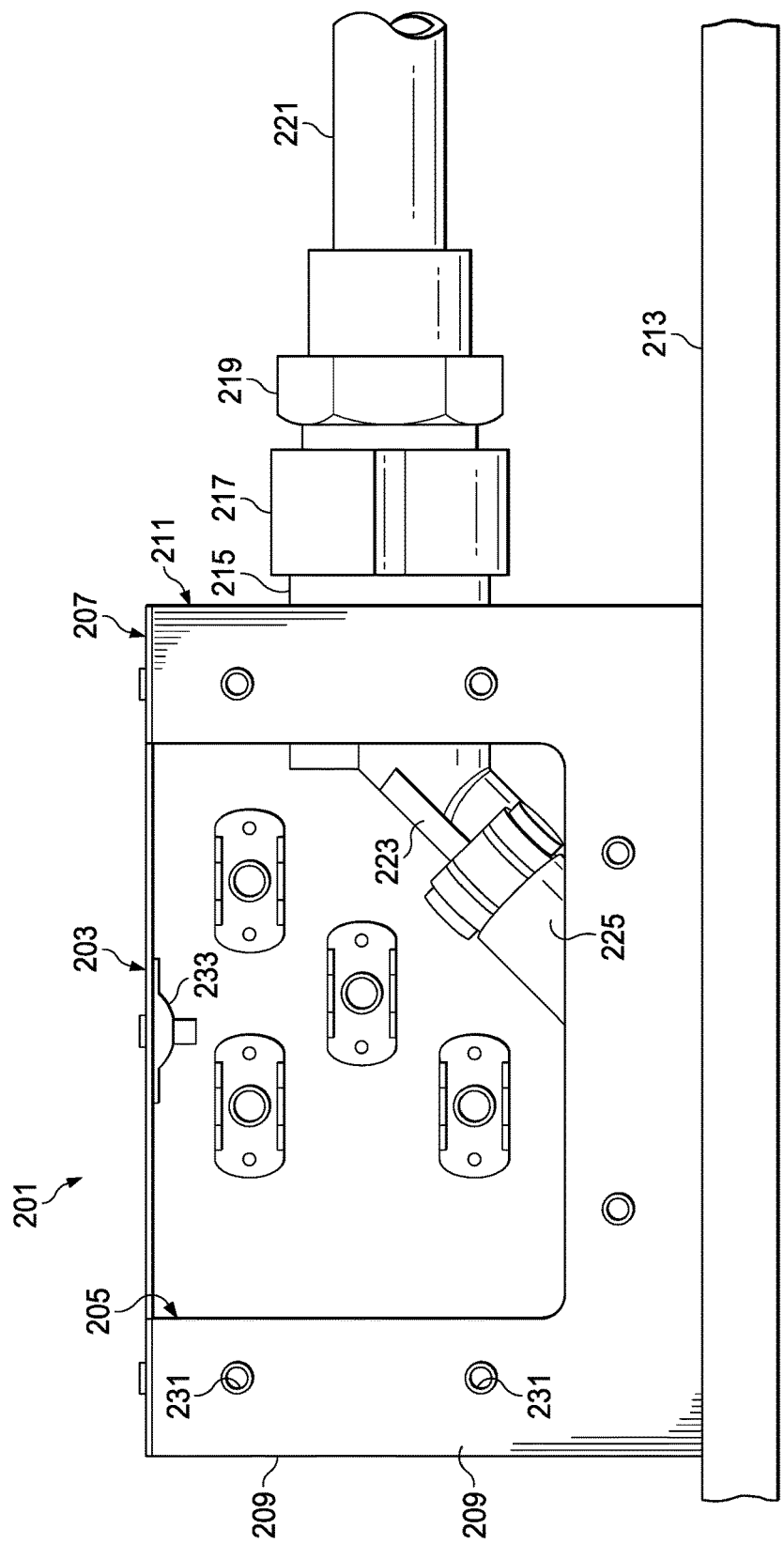
FIGS. 2A through 2D illustrate various views of an enclosure arrangement according to some embodiments.
Figure 2B:
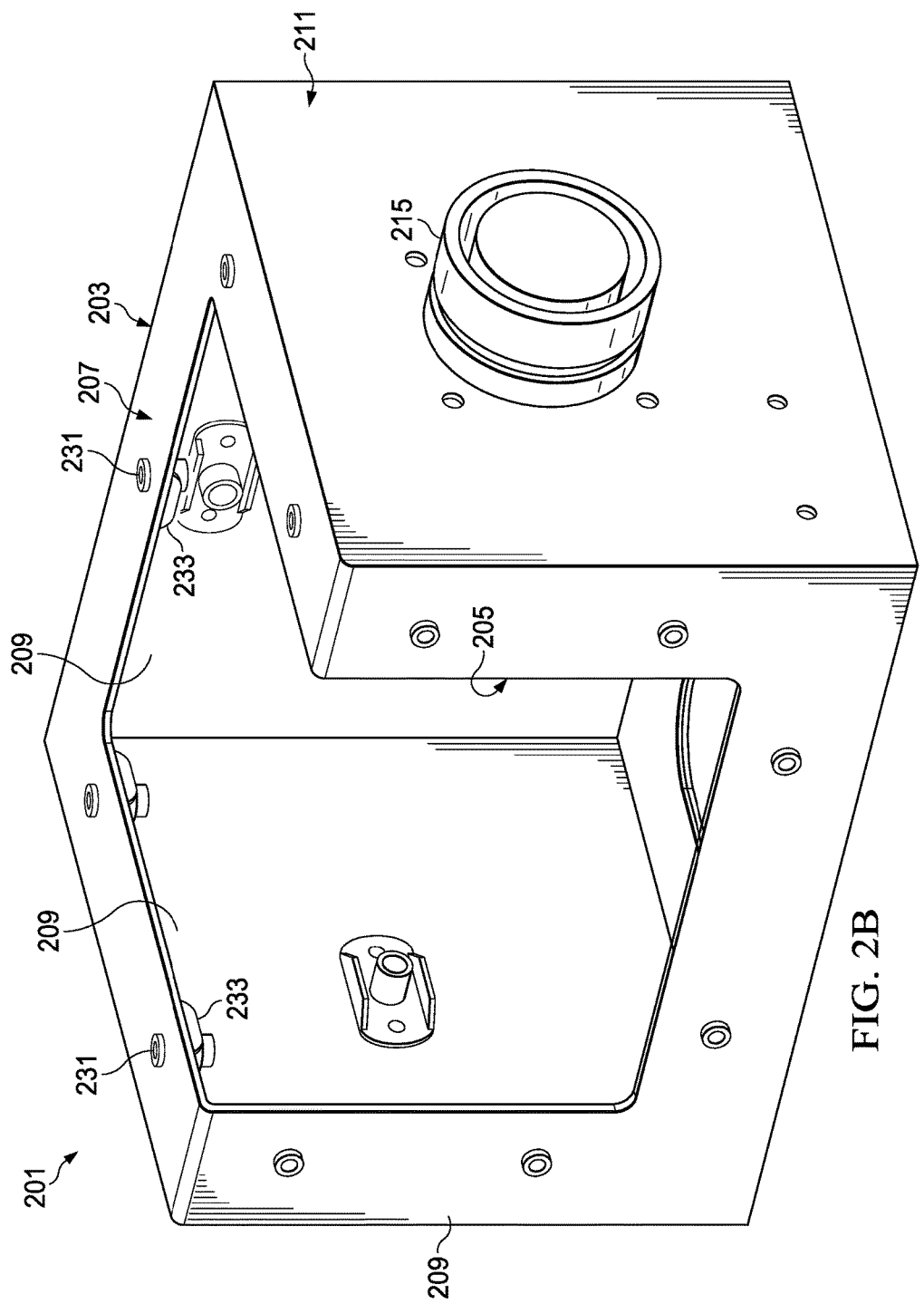
Figure 2C:
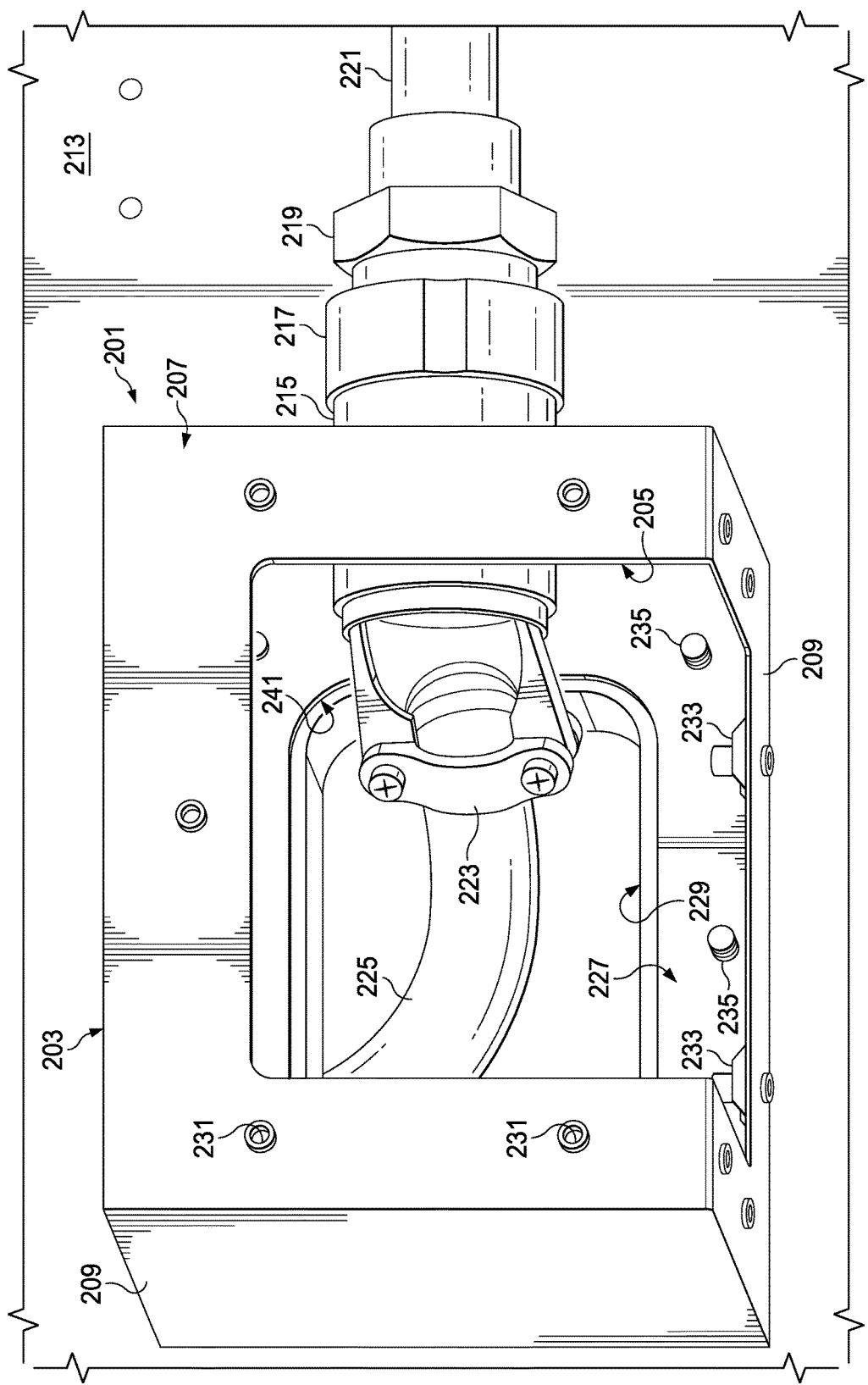
Figure 2D:
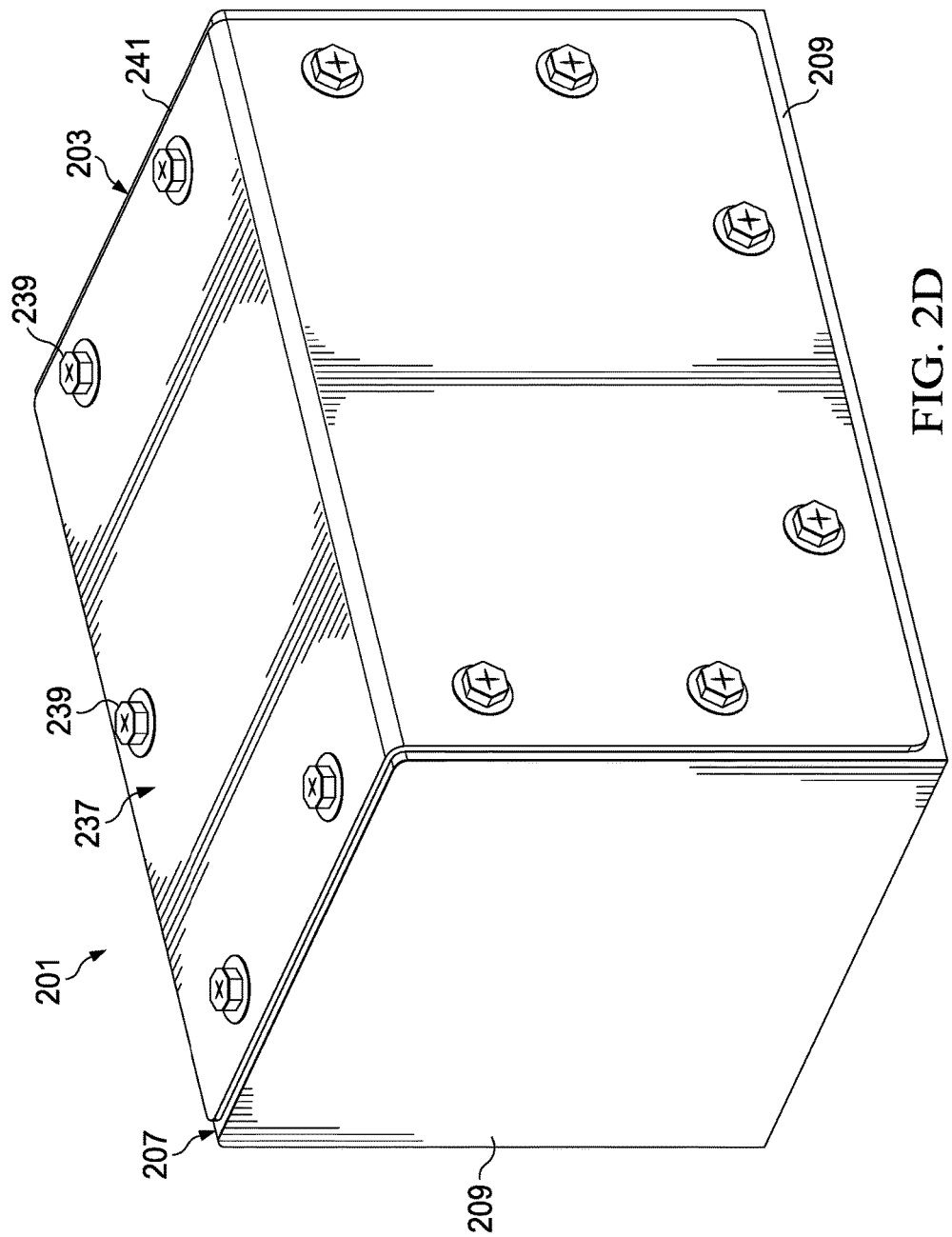

FIGS. 2A through 2D illustrate various views of an enclosure arrangement 201 according to some embodiments. FIG. 2A illustrates a side view of the enclosure 203. FIG. 2B illustrates an interior view of the enclosure 203. FIG. 2C illustrates a top view of the enclosure 203 and shell opening 229 in the mounting surface 213. FIG. 2D illustrates a view of the enclosure 203 with a cover 237 installed. An enclosure arrangement 201 may include an enclosure 203 providing a system for an external line 221 to connect to an internal line 225, which passes through a mounting surface 213. The enclosure 203 may be a weather or environment resistant structure that is attached to a mounting surface 213. In some embodiments, the mounting surface 213 is an outer skin, outer shell, airframe, or other structure of a vehicle such as a rotorcraft. The external line 221 and internal line 225 may be electrical lines such as electrical cables of a cable system or harness, fluid lines such as hydraulic, fluid transfer, fuel, coolant, oil lines or like, or pneumatic lines. The enclosure 203 protects the space around the mounting surface 213 from intrusion of environmental contaminants such as exhaust, precipitation, dust, and the like, or vehicle fluids such as dripping fuel, coolant, oil, hydraulic fluid, or the like, while permitting the lines 221 and 225 to effectively transfer power, electrical signals or payload through the mounting surface 213. The internal line 225 may be attached to the connector 215 by an internal fitting 223, and the external line 221 may be attached to the connector 215 by an external fitting 219. In some embodiments, the fittings 219 and 223 may be affixed to the connector 215 by a retainer 217 that prevents the fitting 219 and 223 from becoming unintentionally disconnected from the connector 215. Additionally, in some embodiments, the connector 215 may be part of a harness or assembly that includes the internal line 225 or the external line 221. Thus, the connector 215 may be affixed to the enclosure as part of the installation of the internal line 225 harness, or as part of the external line 221 harness.

The enclosure 203 may be a box shaped structure formed from sheet metal, cast material, a polymer or composite, or another material resistant to environmental conditions. In embodiments where the enclosure 203 is formed from a sheet material such as sheet metal, the corners or seams of the enclosure 203 may be sealed by welding, by adhesives, sealant, caulk, a gasket, by mechanical structures such as rolled seams, fasteners, or the like. In some embodiments, the enclosure 203 is produced separately from the vehicle on which it is mounted, and may be installed on the mounting surface 213 using mounting fasteners 235 such as rivets, bolts or screws or other mechanical fasteners such as clips or the like, or using an adhesive, a sealant, or the like. In other embodiments, the enclosure 203 may be integrally formed as part of the mounting surface 213, outer shell or skin of the vehicle.

The enclosure 203 has an interior cavity bounded by a chassis having walls including sidewalls 209, a connector surface 211, a top side 207 and a bottom side 227. The connector surface 211 has openings (not shown) permitting the mounting of one or more connectors 215. In some embodiments, the connector surface 211 is substantially perpendicular to the bottom side 227 of the enclosure 203, and in other embodiments, the connector surface 211 may be angled in relation to the bottom side 227 to provide greater fluid runoff for connected external lines 221.

In some embodiments, the connectors 215 are weatherproof connectors such as D38999 military specification-type connectors that are ruggedized to prevent infiltration of fluids through the connector. However, in other embodiments, other weather proof connectors such as weatherproof hydraulic, pneumatic, fluid transfer or electrical connectors may be provided on the connector surface 211. The connectors 215 are pass through elements that have an exterior connection point and an internal connection point for connection of the external line 221 and internal line 225, respectively.

As shown in FIG. 2C, the enclosure 203 encloses a shell opening 229 in the mounting surface 213. The shell opening 229 permits internal lines 225 to pass through the mounting surface 213. The bottom side 227 of the enclosure 203 may have a pass through opening 241 that is at least as large as, and exposes, the shell opening 229. In some embodiments, the pass through opening 241 is larger than the shell opening 229. This may be done, for example, to prevent the internal line 225 from chafing or rubbing against the edge of the pass through opening 241, to allow room for additional sealant, or for aesthetics.

The bottom side 227 of the enclosure 203 has a shape or contour that closely fits the shape of the mounting surface 213 where the enclosure 203 is installed, providing a minimal seam that would need to be sealed. Thus, while the disclosed enclosure embodiment may be shown with substantially flat bottom sides 227, the enclosure 203 is not limited to such an arrangement. In some embodiments, the bottom side 227 of the enclosure 293 is substantially flat, and in other embodiments, the bottom side 227 of the enclosure is contoured. For example, a contoured bottom side 227 may be concave or convex in one or multiple directions, may be stepped, notched, or otherwise contoured.

One or more walls may have an access opening 205 permitting access to the interior cavity of the enclosure 203 for installation or maintenance of the internal line 225. The access opening 205 may extend contiguously across multiple walls. For example, in some embodiments, the access opening 205 extends from the top side 207 to a sidewall 209. One or more fastener openings 231 are provide around the access opening 205. As shown in FIG. 2D, cover 237 may be installed on the enclosure chassis over the access opening 205. The cover 237 may be attached using cover fasteners 239 extending through the fastener openings 231. In some embodiments, the cover fasteners 239 may be secured by, for example, nut plates 233 provided on the interior of the enclosure 203 behind the fastener openings 231. In some embodiments, the cover 237 may be sealed against the surface of the enclosure using a sealant, a gasket, or the like. In some embodiments, the enclosure 203 may be mounted to the mounting surface 213 and the cover 237 mounted over the access opening 205. A sealant may subsequently be applied from the outside to the seam between the enclosure 203 and the mounting surface 213, and the seam between the cover 237 and exterior of the enclosure 203. Applying the sealant to the seams from the outside improves technicians' ability to remove the sealant when needed to access the interior of the enclosure 203 for maintenance, inspection or for replacement of the enclosure 203 or internal lines 225.

Figure 3A:
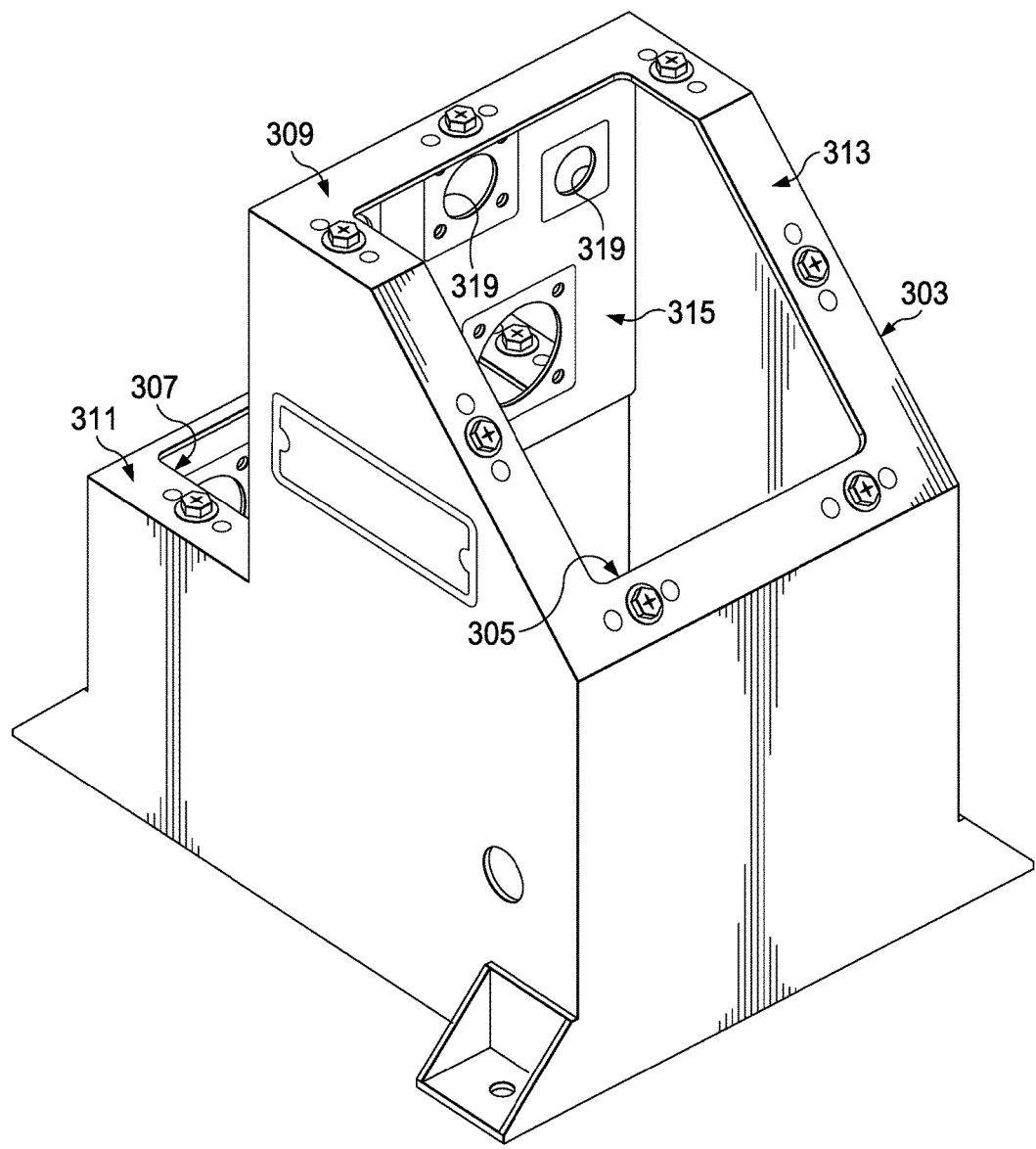
FIGS. 3A and 3B illustrate various views of a stepped enclosure according to some embodiments.
Figure 3B:
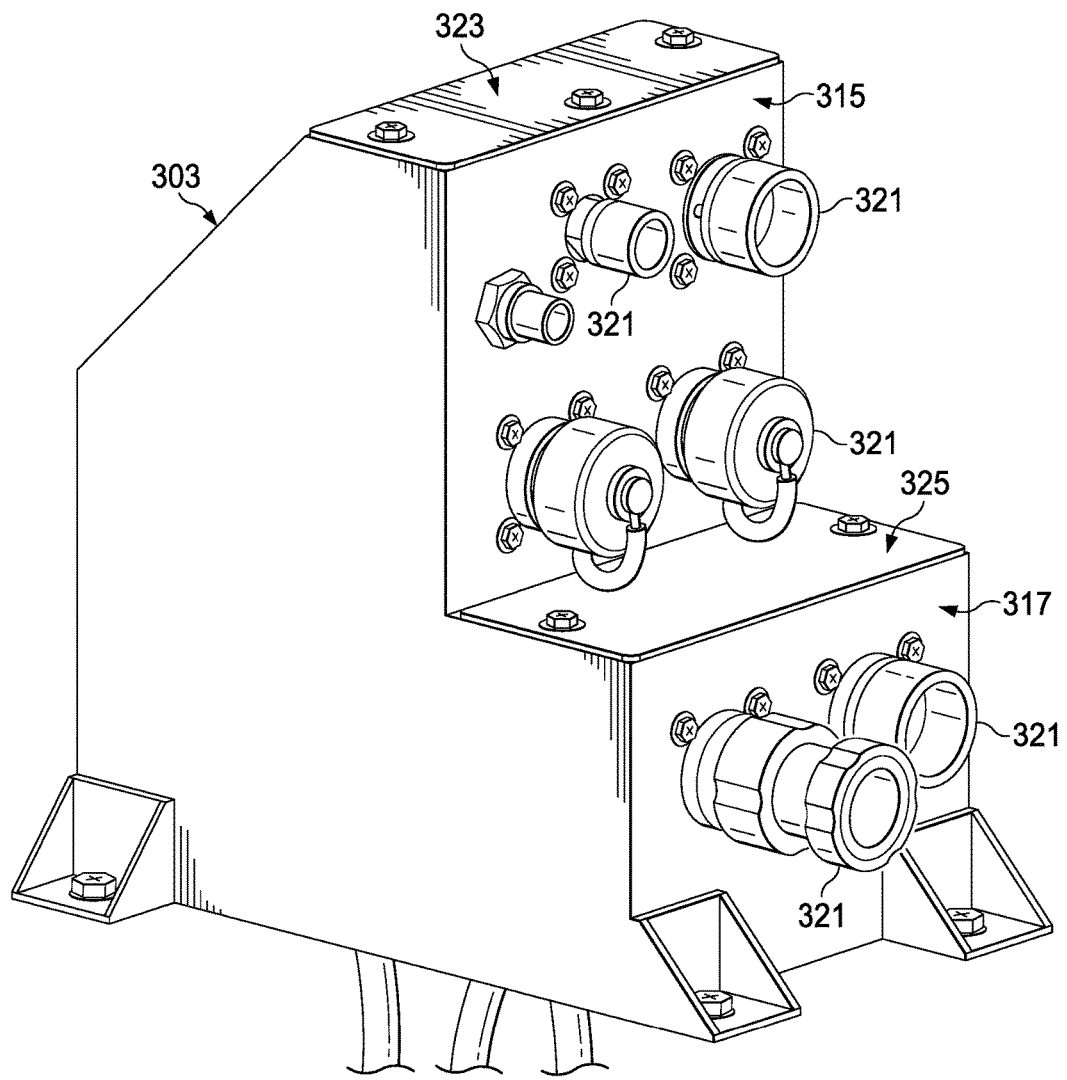

FIGS. 3A and 3B illustrate various views of a stepped enclosure 303 according to some embodiments. In some embodiments, the stepped enclosure 303 has multiple connector surfaces 315 and 317, such as an upper connector surface 315 and a lower connector surface 317. The upper connector surface 315 and lower connector surface 317 are spaced apart and may each have openings 319 in which connectors 321 are disposed. In some embodiments, the connector surfaces 315 and 317 lie in different planes, and are vertically or laterally separated from each other. In some embodiments, the connector surfaces 315 and 317 may face in a same direction, and in other embodiments, the connector surfaces 315 and 317 are disposed on different sides of the stepped enclosure 303 or facing different directions.

The stepped enclosure 303 may have an upper access opening 305 disposed in an upper top side 309 in proximity to the upper connector surface 315 and providing access to internal lines attached to connectors 321 disposed in the upper connector surface 315. Similarly, the stepped enclosure 301 may have a lower access opening 307 disposed in a lower top side 311 in proximity to the lower connector surface 317 and providing access to internal lines attached to connectors 321 disposed in the lower connector surface 317. An upper cover 323 may be attached over the upper top side 309 covering the upper access opening 305, and a separate, lower cover 325 may be attached over the lower top side 311 covering the lower access opening 307. In some embodiments, one or more of the access openings 305 and 307 of the stepped enclosure 303 may extend contiguously over multiple surfaces. For example, in some embodiments, the upper access opening 305 may extend from the upper top side 309 into a secondary top side 313.

Figure 4A:
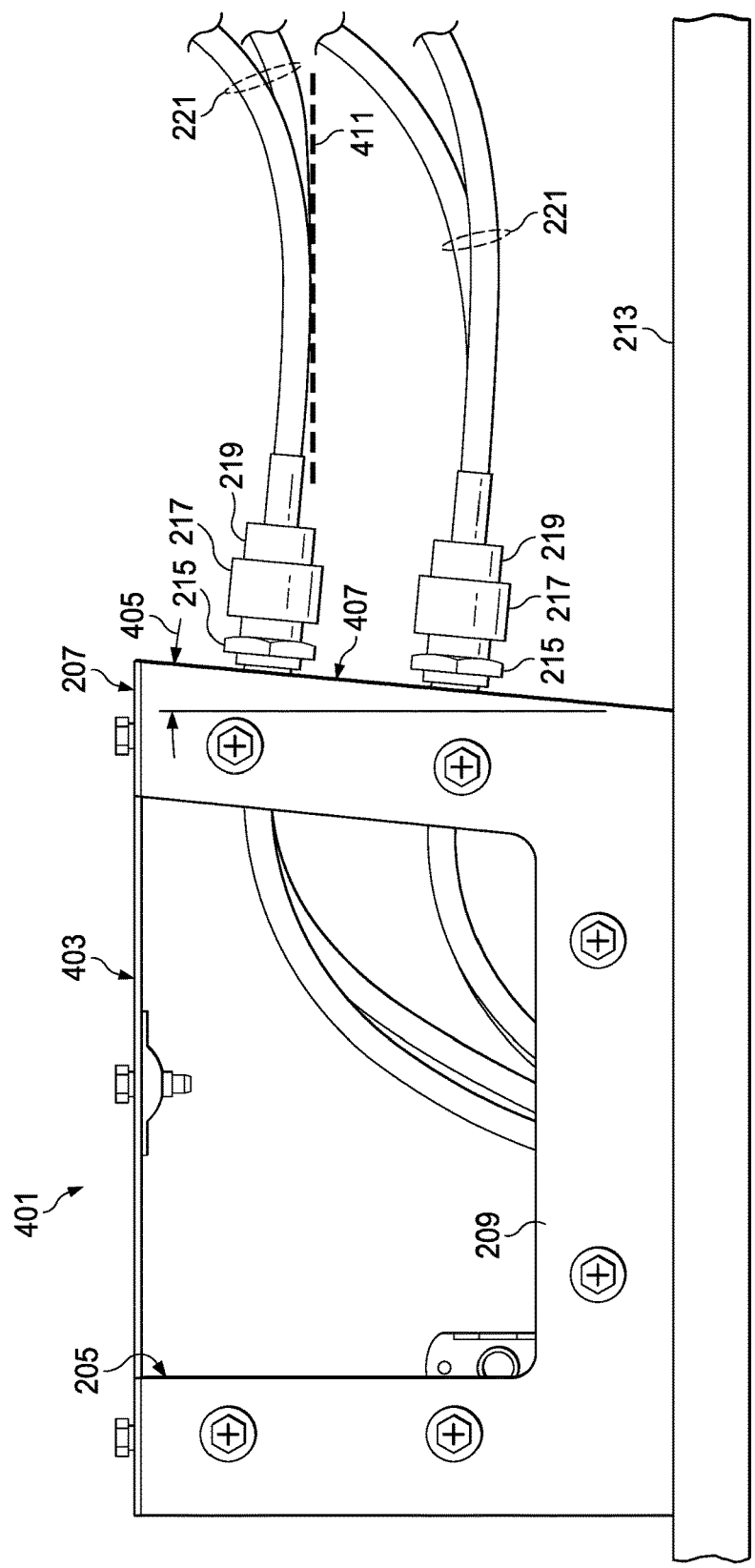
FIGS. 4A through 4D illustrate views of enclosures with angled connector surfaces according to some embodiments.
Figure 4B:
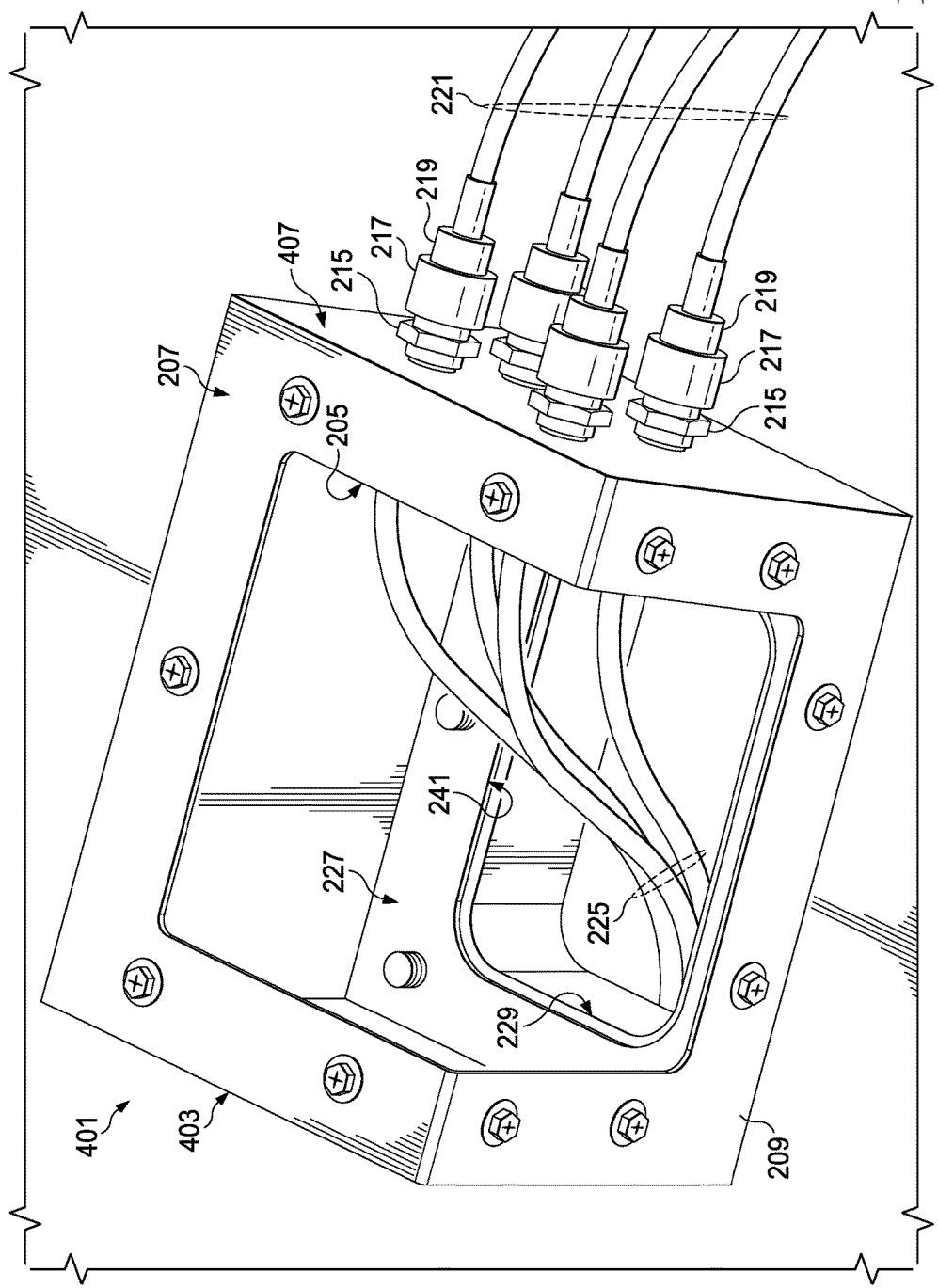
Figure 4C:
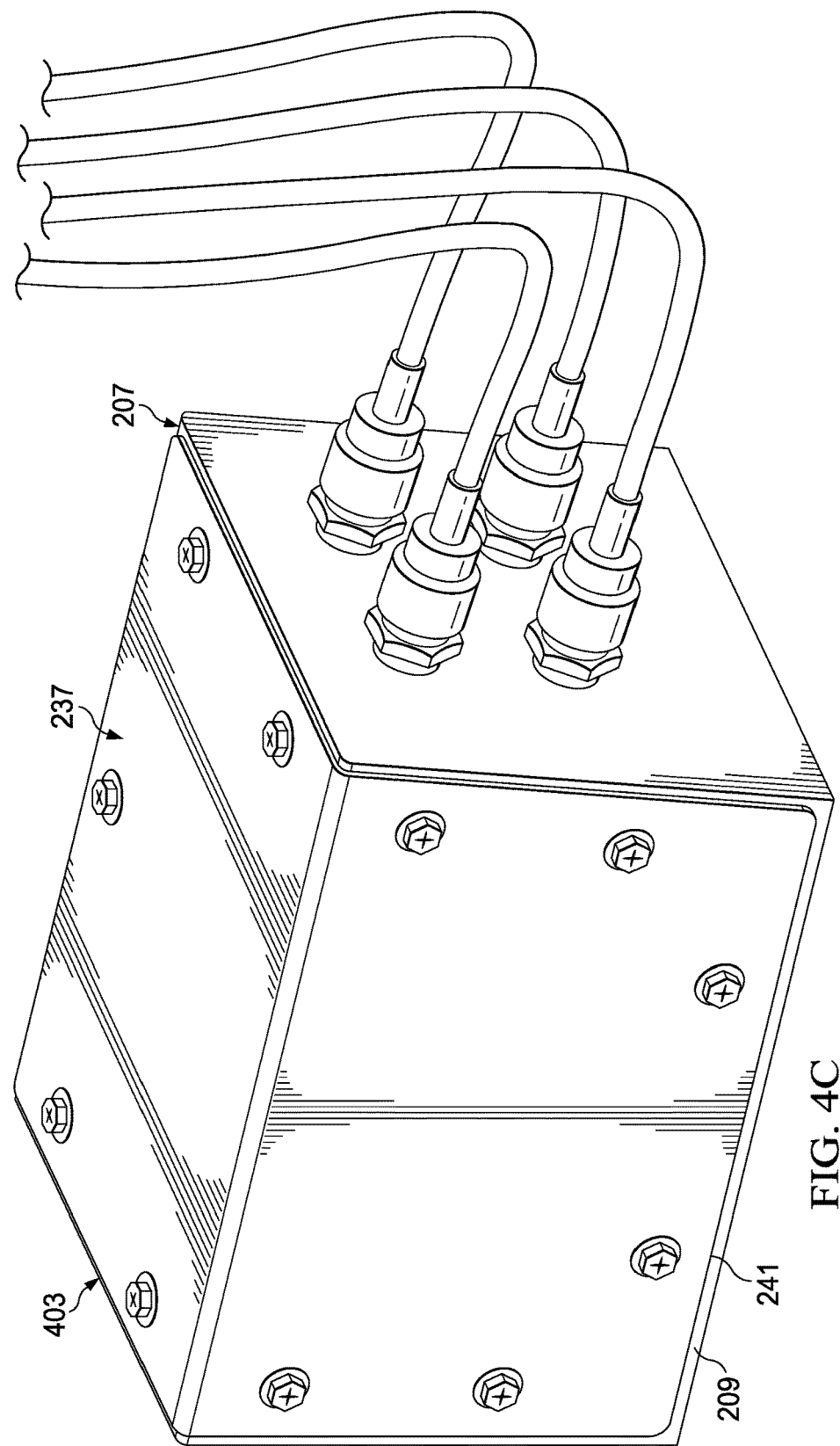

FIGS. 4A through 4D illustrate views of an enclosure 403 with one or more angled connector surfaces 407 according to some embodiments. FIG. 4A illustrates a side view of an enclosure arrangement 401 with an enclosure 403 having an angled connector surface 407 according to some embodiments. FIG. 4B illustrates an interior view of an enclosure arrangement 401 with an enclosure 403 having an angled connector surface 407 according to some embodiments. FIG. 4C illustrates a side view of an enclosure arrangement 401 with an enclosure 403 having an angled connector surface 407 with a cover 237 installed according to some embodiments.

The angled connector surface 407 may be angled toward the mounting surface 213 to cause external lines 221 to form a drip loop that is spaced apart from the connectors 215. The drip loop is formed by the external lines 221 having a lowest point lying on a plane 411. The plane 411 is below the portion of the external line nearest the connectors 215. Thus, fluids running down the outer surface of the external lines 221 will end to accumulate, and drip from, the lowest point of the external lines 221.

The angled connector surface 407 may have a first angle 405 from a vertical plane or from a plane perpendicular to the top side 207 or bottom side 227. In some embodiments, the first angle 405 may be about 5 degrees, but in other embodiments, the first angle 405 may be between about 3 degrees and about 10 degrees. The first angle 405 may be dictated by the size of the enclosure 403, the distance of the connectors 215 from the mounting surface 213 and the properties of the external lines 221. For example, the external lines 221 may have minimum radius requirements due to the stiffness or other physical properties of the external lines 221. Generally, a thicker or stiffer external line 221 will have a larger minimum radius since thicker external lines 221 tend to bend less easily. Thus, the first angle 405 of the angled connector surface 407 may be relatively small compared to an angle of an angled connector surface 407 for a more flexible external line 221. A smaller first angle 405, where the angled connector surface 407 is more vertical, permits the external line to have more room for any required bend without contacting the mounting surface 213. Similarly, a connector 215 that is relatively close to the mounting surface 213 provides less room for an external line 221 to bend away from the mounting surface 213, so the first angle 405 of the angled connector surface 407 will need to be smaller, or the angled connector surface 407 more vertical, than an angled connector surface 407 with a connector 215 spaced farther from the mounting surface 213.

Figure 4D:
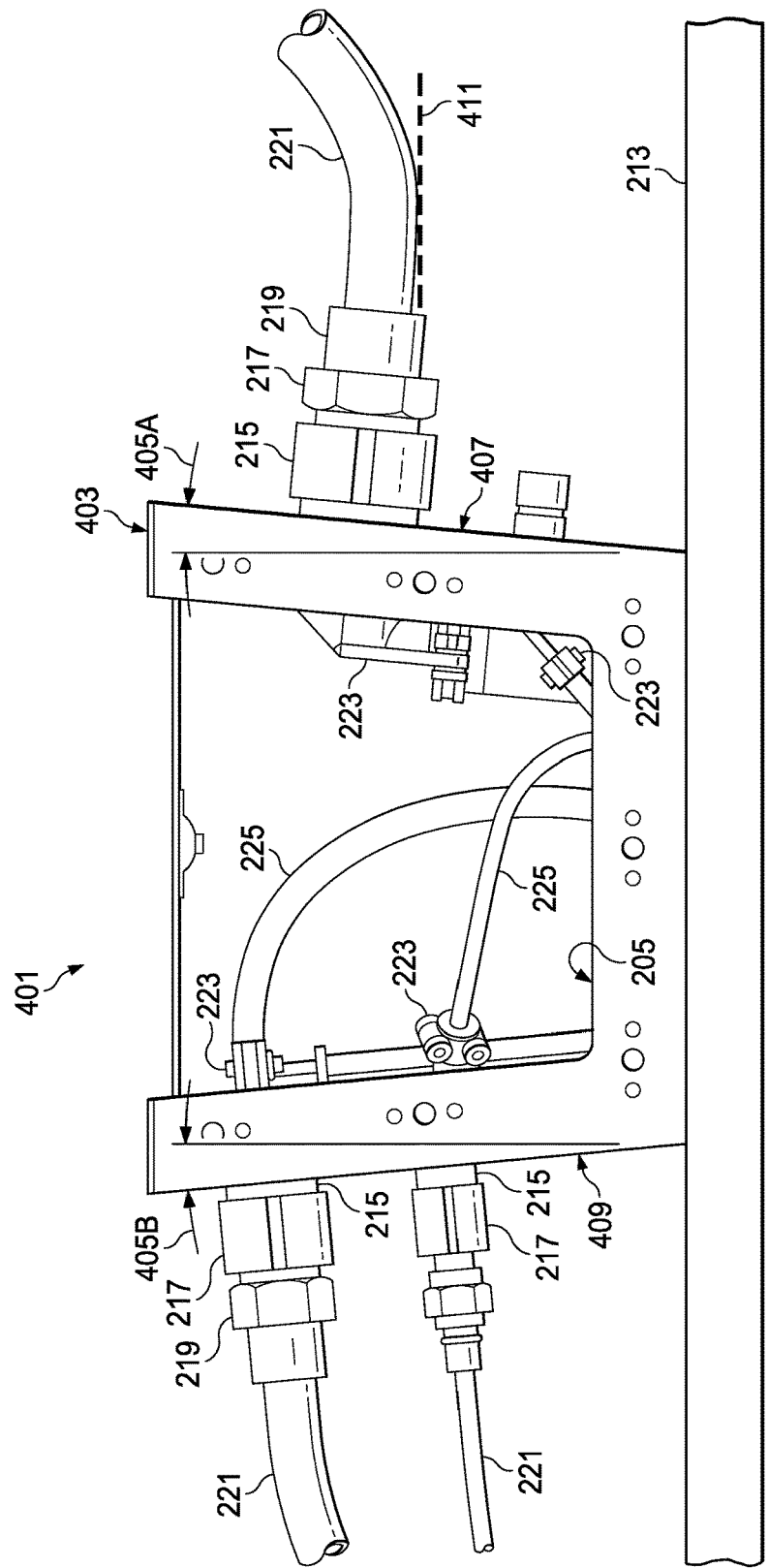

FIG. 4D illustrates a side view of an enclosure arrangement 401 with an enclosure 403 having multiple angled connector surfaces 407 and 409 according to some embodiments. In such an embodiment, the enclosure 403 has a first angled connector surface 407 at a first angle 405A and a second angled connector surface 409 at a second angle 405B. The first angle 405A may be the same as, or different than, the second angle 405B. Additionally, the first angled connector surface 407 may be opposite the enclosure 403 from the second angled connector surface 409, and the access opening 205 may be disposed between the angled connector surfaces 40y and 409. In other embodiments, the first angled connector surface 407 may be adjacent to the second angled connector surface 409. Thus, external lines 221 may approach the enclosure 403 from different sides, and connect to internal lines 225 that pass through a common shell opening 229.

Figure 5A:
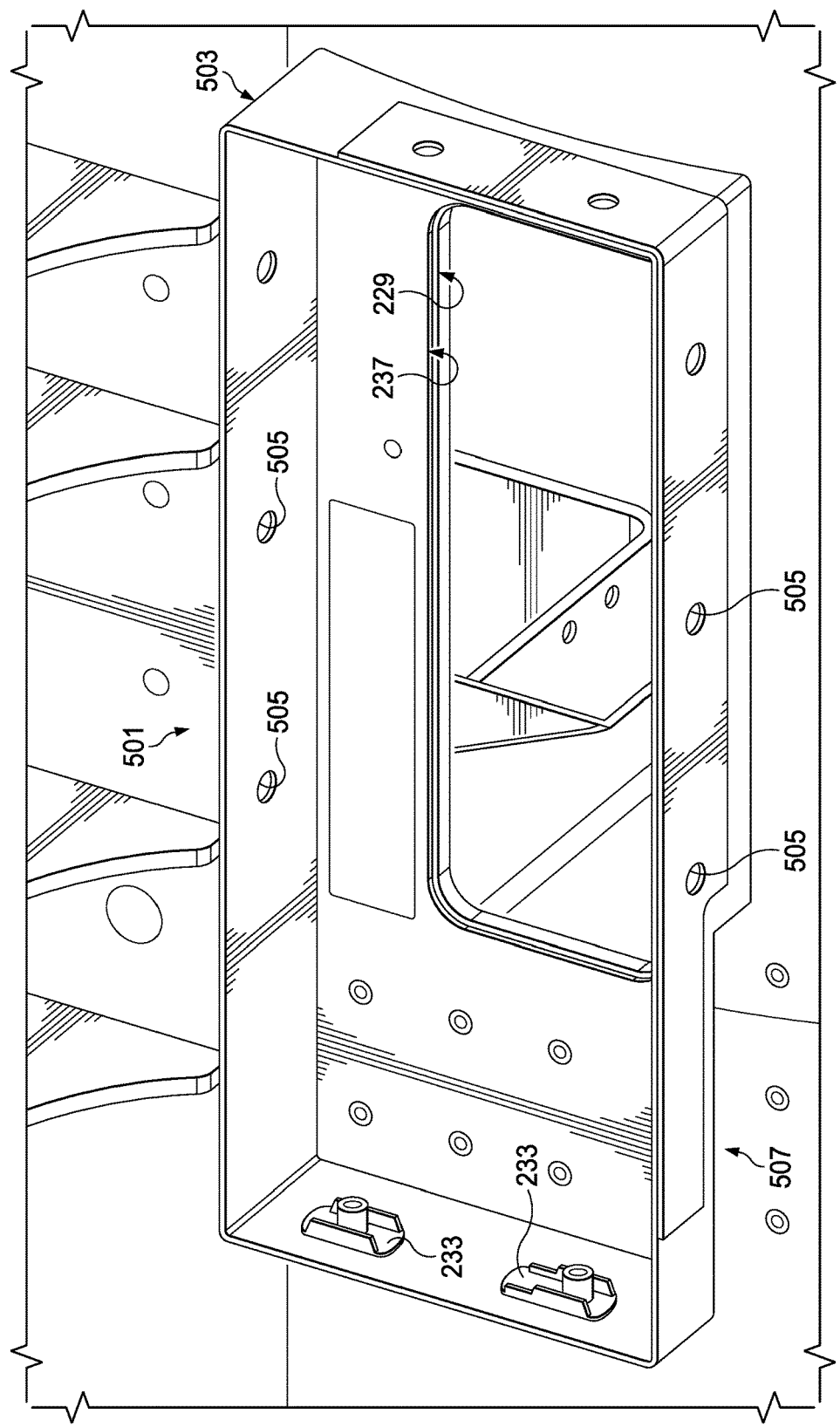

FIGS. 5A through 5D illustrate views of an enclosure 501 assembled from multiple body portions according to some embodiments. FIG. 5A illustrates a base portion 503 that forms a lower portion of the enclosure 501 according to some embodiments. The base portion 503 may be formed with one or more features, such as a recess 507, that require modular construction of the enclosure 501. The base portion 503 may have a pass through opening 241 that exposes the shell opening 229. Additionally, the base portion 503 may have flanges, edges or sides with assembly openings 505 for attaching additional elements. Nut plates 233 may be provided for attaching the additional elements.

Figure 5B:
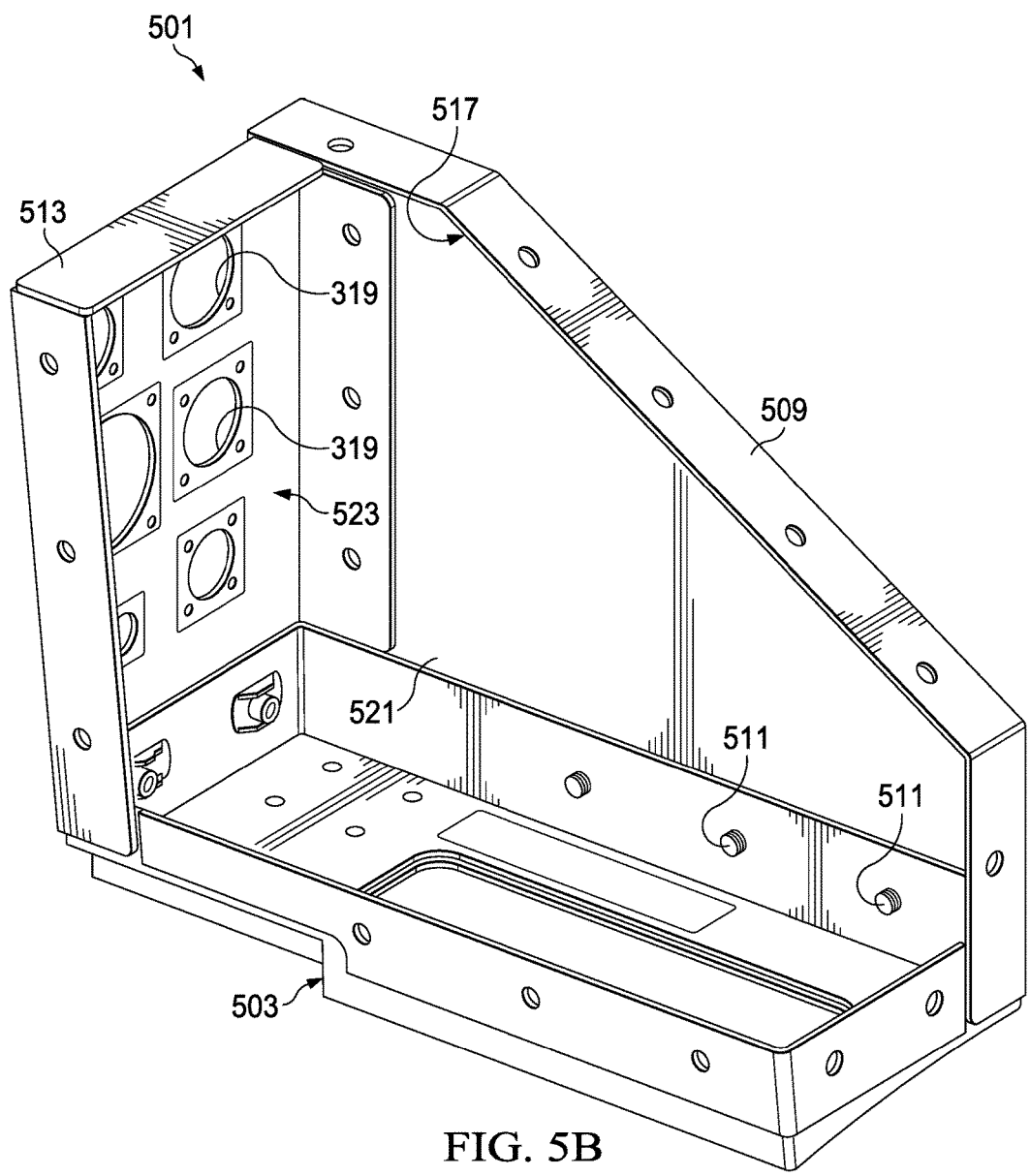

FIG. 5B illustrates an interior view of the enclosure 501 with a front portion 523 and side portion 521 according to some embodiments. The front portion 523 may be a connector surface and may have openings 319. In an embodiment, the front portion 523 and side portion 521 may be attached to each other, and to the base portion 503 using fasteners 511 in the assembly openings 505. Fasteners 511 may retain the front portion 523 and side portion 521 to the base portion 503 by the nut plates 233, or by threaded surfaces of the assembly openings 505. In other embodiments, the front portion 523 and side portion 521 may be attached to the base portion 503 by adhesives, welding, rivets, screws, attachment fixtures, or the like. The side portion 521 may have a first flange 509 and the front portion 523 may have a second flange 513, which may border or define an access opening 517. The first flange 590 and second flange 512 may have openings or other attachment points for retainers used to affix a cover 519.

FIG. 5C illustrates an interior view of the enclosure 501 with external lines 221 and internal lines 225 affixed to the front portion 523. Connectors 215 may be affixed in or disposed in the openings 319 in the front portion 523 for attachment of the internal and external lines 221 and 225. In some embodiments, the side portion 521 may be shaped to conform to the curvature of the internal lines 225, with a curved or angled upper edge to reduce unused space in the interior of the enclosure 501.

Figure 5D:
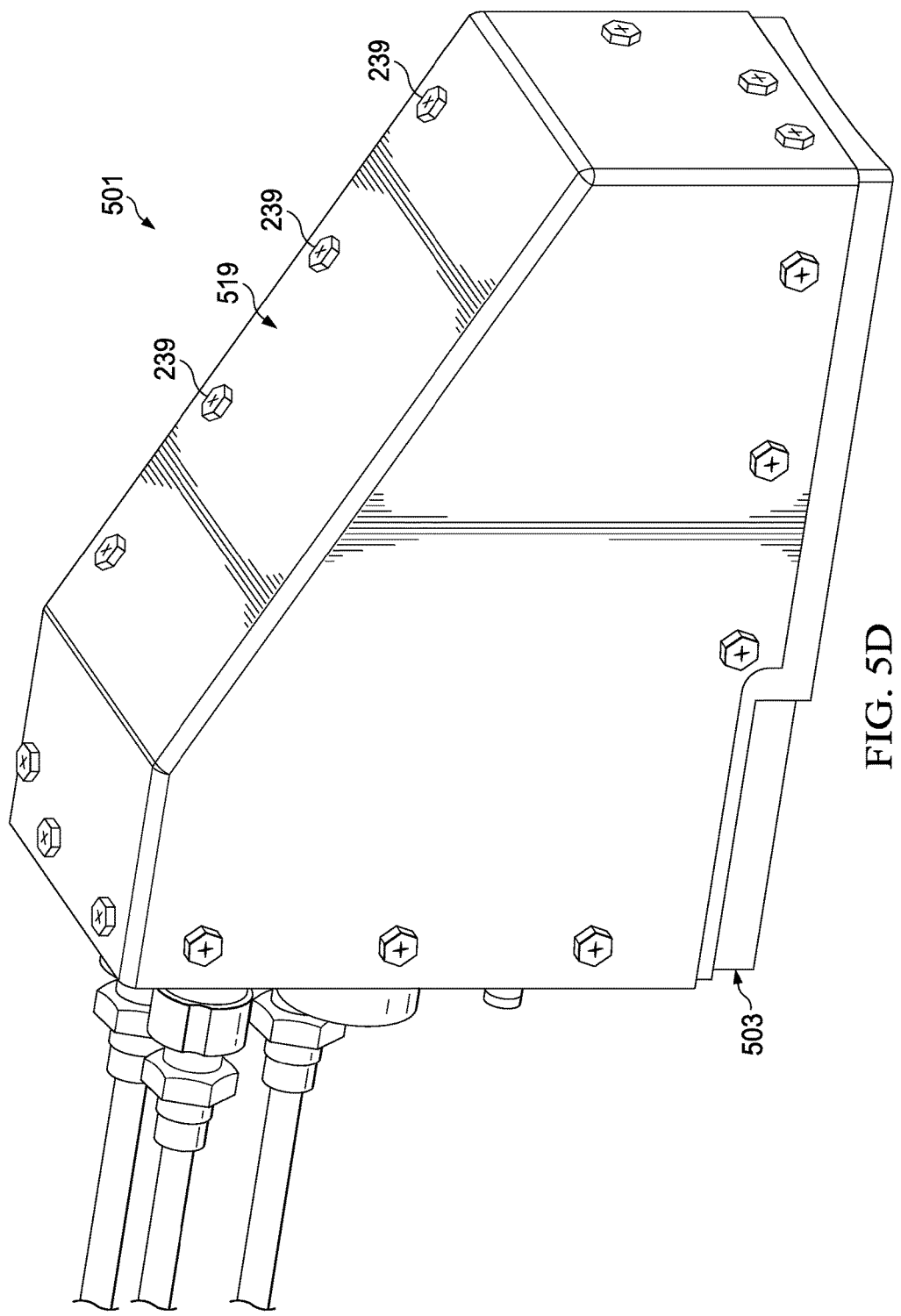

FIG. 5D Illustrates a view of an enclosure 501 with cover 519 attached. In some embodiments, the cover 519 exposes at least a portion of the base portion 503, and is attached to the first flange 509 and second flange 513 by fasteners, adhesive, or the like. In some embodiments where the side portion 521 is shaped to conform to the internal lines 225, the cover 519 is shaped to conform or follow the shape of the first flange 509 to provide a tight seal for the enclosure. Thus, the cover 519 may have multiple faces on one or more sides, or may be curved, faceted, or the like.

Figure 6A:
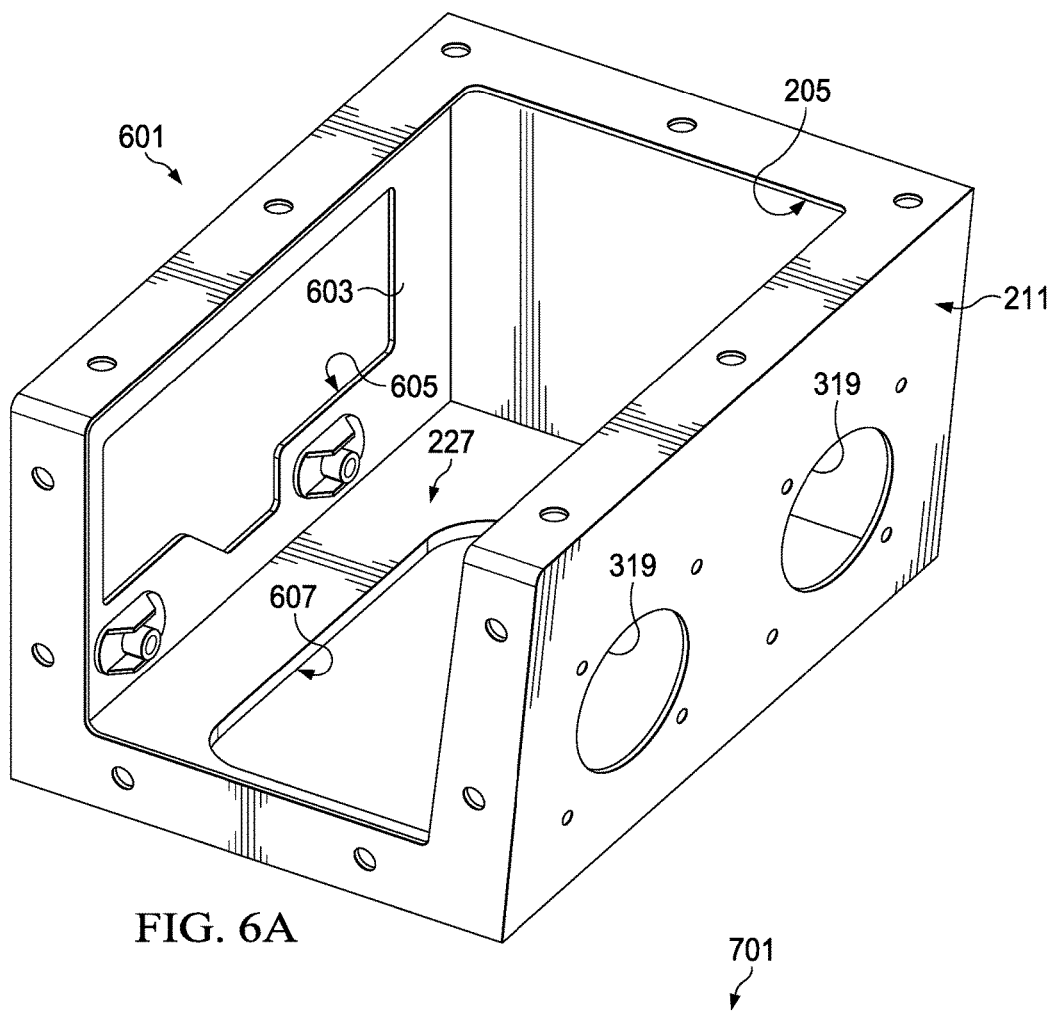
FIGS. 6A and 6B illustrate views of an enclosure with multiples pass through openings according to some embodiments.
Figure 6B:
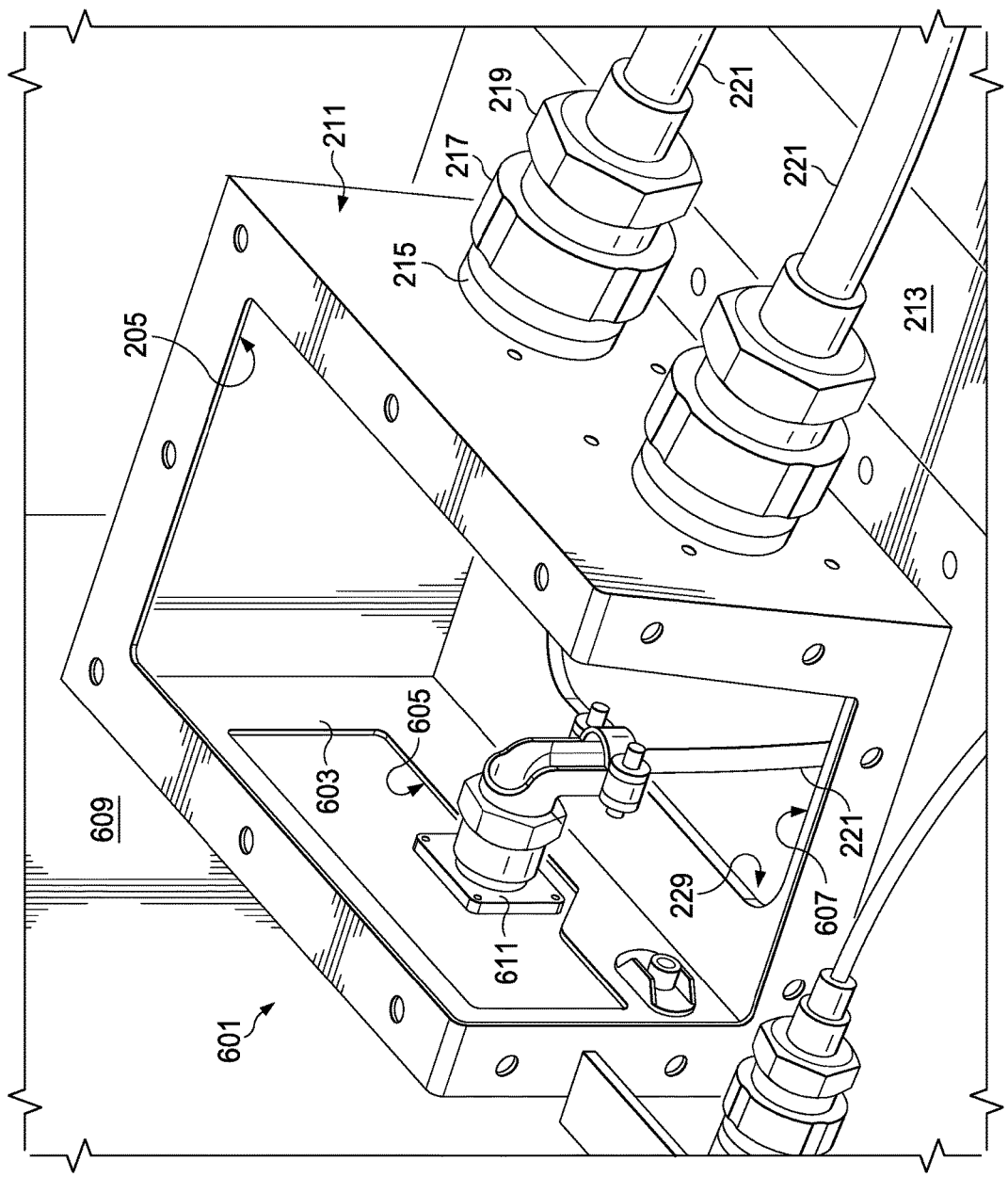

FIGS. 6A and 6B illustrate views of an enclosure 601 with multiple pass through openings 605 and 607 according to some embodiments. In some embodiments, the enclosure 601 may be installed on a first mounting surface 213 and against a second mounting surface 609 such as a bulkhead, wall or the like to cover second connectors 611, fixtures, lines, pass through openings, or the like exiting the second mounting surface 609. A bottom side 227 may have a first pass through opening 607 exposing a shell opening 229 in the first mounting surface 213, and a first sidewall 603 may have a second pass through opening 605.

The connector surface 211 may have one or more openings 319 for first connectors 215. In some embodiments, the connector surface 211 is opposite the enclosure 601 from the first sidewall 603, and in other embodiments, the connector surface 211 is adjacent to the first sidewall 603. An access opening 205 is disposed in one or more sidewalls of the enclosure 601 that are different from the first sidewall 603, the bottom side 227 and the connector surface 211.

In some embodiments, internal lines 221 connected to the connectors 215 and connectors 611 extend from the respective connectors 215 and 611 through the first pass through opening 607 and the shell opening 229.

While the enclosure 601 is illustrated with a first pass through opening 607 and a second pass through opening 605, the presented principles are not limited to such embodiments, as the enclosure 601 may have more than two pass through openings. For example, the enclosure 601 may be installed in a corner against a second mounting surface 609 and a third mounting surface, and may have a third pass through opening in the side against the third mounting surface.

Figure 7:
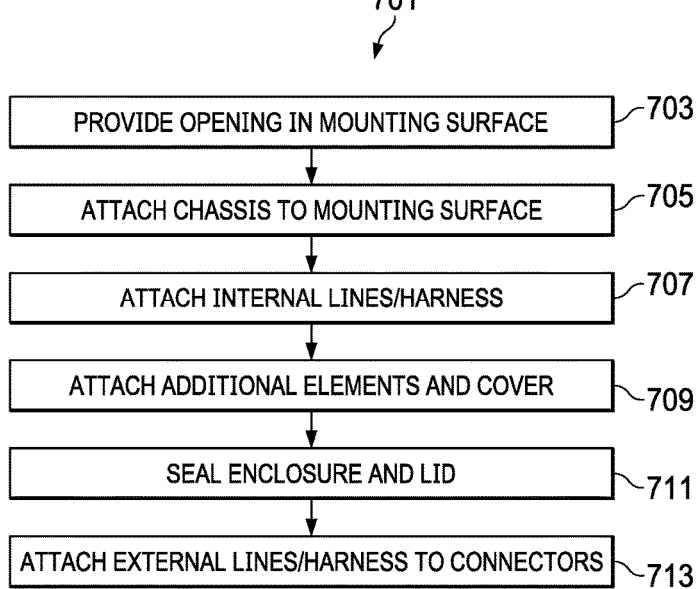
FIG. 7 is a flow diagram illustrating a method for installing an enclosure according to some embodiments.

FIG. 7 is a flow diagram illustrating a method 701 for installing an enclosure according to some embodiments. In block 703, an opening is provided in a mounting surface of a vehicle. In some embodiments, the opening is a shell opening on a bulkhead, airframe, an outer surface or skin of a rotorcraft. In block 705, the chassis of an enclosure is attached to the mounting surface. The chassis is disposed around the shell opening, and may be a base portion of a multipart enclosure and one or more additional sides of the enclosure, or one or more parts of an enclosure with a bottom side. In some embodiments, attachment of the chassis includes attaching a base portion of the enclosure to the mounting surface, and then attaching one or more side or top portions of the enclosure to the base portion. In other embodiments, the chassis includes a bottom side, one or more connector surfaces, and one or more other sides. Additionally, in some embodiments, one or more connectors may be installed as part of the attachment of the chassis to the mounting surface. The connectors may be disposed in the connector surface, and may be attached to the connector surface prior to the connector surface being attached to the mounting surface. In other embodiments, the connectors may be attached to the connector surface after the chassis or connector surface are attached to the mounting surface, for example, during subsequent connection of lines or harnesses to the enclosure. The chassis may also be mounted to one or more mounting surfaces. For example, an enclosure with multiple pass through openings disposed on different sides may be attached to two different, adjacent mounting surfaces, and may cover one or more shell openings, fixtures, connectors, or the like.

An internal line/harness is attached in block 707. In some embodiments, a harness with one or more internal lines are connected or otherwise secured to the enclosure. The internal lines may be plumbed through the interior of the vehicle and passed through the shell opening for attachment to the enclosure. In some embodiments, the connector may be part of the harness, and installation of the harness may include securing the harness, with the connector and lines, to the connector surface. Thus, pinning, or connection, of wire terminals to connectors that will pass through a connector surface may be done as part of fabrication of the harness or assembly prior to installation of the harness. After the connector is attached to an internal line such as wiring, a hose or tubing of the harness, the harness, including the internal line and connector, may then installed. Connection of the internal harness may include attachment of the connector of the internal harness to the connector surface, for example, by affixing the connector in a connector opening in the connector surface. Therefore, the harness end, including connector, is fastened to a surface of the enclosure in a single operation. In other embodiments, the connectors and lines are installed in a two stage procedure. For example, the connectors may be affixed to the enclosure, passing through the connector surface prior to the internal and external lines being connected. The lines may be attached to the previously installed connector by way of fittings, or the like In block 709 the cover, and any additional elements, are attached to the enclosure. For example, one or more grounding wires, drain tubes, sensor cables, or the like may be attached to the enclosure. Additionally, the cover is attached to the enclosure to cover any access openings, and secured by fasteners or the like.

In block 711, the enclosure and lid are sealed. In some embodiments, a sealant, caulk, adhesive, filler, or the like is applied to the outside of the enclosure over any seams or joints in the enclosure. For example, a sealant may be applied over the seam between the cover and the enclosure chassis, and along the seam between the enclosure and the mounting surfaces. The sealant may be applied to the exterior of the enclosure along the seams so that the sealant may be removed at a later point for access to the interior of the enclosure for maintenance, inspection, or the like, of the internal lines, interior parts of the connectors, or the like. In block 713, external lines or an external harness are attached to the connectors, completing the connection between external lines and the internal lines.

An enclosure according to an embodiment includes a bottom side having a pass through opening, a connector surface having one or more connector openings, a first side adjacent to the connector surface, and a second side having at least a portion of an access opening, where the first side, the second side, the connector surface and the bottom side bound an interior cavity. The enclosure further includes one or more connectors, each of the one or more connectors disposed in a respective connector opening of the one or more connector openings and extending from the interior cavity, through the connector surface, and a cover attached to an exterior surface of at least the second side, the cover covering the access opening.

In some embodiments, the connector surface is nonparallel to a first plane that is perpendicular to the bottom side. In some embodiments, the connector surface is at a first angle to the first plane, the connector surface has a first edge and a second edge, the second edge is farther from the bottom side than the first edge, and the first edge is closer to the first plane than the second edge. In some embodiments, the first angle is between about 3 degrees and about 10 degrees. In some embodiments, the first angle is about 5 degrees. In some embodiments, the second side is a top side. In some embodiments, the enclosure further includes a third side, the access opening extends contiguously from the top side to the third side, and the cover extends over the top side and over the third side.

An embodiment rotorcraft includes a mounting surface having a shell opening disposed therein, and an enclosure disposed on the mounting surface, the enclosure having a plurality of sides and further having a first connector surface extending away from the mounting surface, with the plurality of sides and the first connector surface bounding an interior cavity of the enclosure disposed over the shell opening, and where the first connector surface has a first connector opening. A first connector is disposed in the first connector opening and extends from the interior cavity through the first connector surface, and a first internal line is connected to an interior portion of the first connector and extending through the shell opening. A first external line connected to an external portion of the first connector.

In some embodiments, the first connector surface is at a first angle to a first plane that is perpendicular to the mounting surface, the first connector surface has a first edge and a second edge, the second edge is farther from the mounting surface than the first edge, and the first edge is closer to the first plane than the second edge. In some embodiments, the first angle is between about 3 degrees and about 10 degrees. In some embodiments, the enclosure further has a second connector surface extending away from the mounting surface and bounding the interior cavity, the second connector surface has a second connector opening and is separate from the first connector surface, and the second connector surface faces a different direction from the first connector surface. The rotorcraft may further include a second connector disposed in the second connector opening and extending from the interior cavity through the second connector surface, a second internal line connected to an interior portion of the second connector and extending through the shell opening, and a second external line connected to an external portion of the second connector. In some embodiments, the second connector surface is at a second angle to the first plane, the second connector surface has a third edge and a fourth edge, where the fourth edge is farther from the mounting surface than the third edge, and the third edge is closer to the first plane than the fourth edge. In some embodiments, the first external line has a first line portion, a second line portion, and a third line portion, the second line portion is farther from the first connector than the first line portion and is closer to the first connector than the third line portion, and the second line portion is closer the mounting surface than the first line portion and the third line portion. In some embodiments, the enclosure is a stepped enclosure and further has a second connector surface extending away from the mounting surface and bounding the interior cavity, the second connector surface has a second connector opening and is separate from the first connector surface, and the second connector surface faces a same direction as the first connector surface. In some embodiments, rotorcraft further includes a cover attached to the enclosure over an access opening of the enclosure that extends over two or more sides of the plurality of sides.

An embodiment method includes providing an enclosure having a bottom side with a pass through opening, the enclosure further having a connector surface with a connector opening, the enclosure further having a first side adjacent to the connector surface and a second side. The first side, the second side, the connector surface and the bottom side bound an interior cavity of the enclosure. The method further includes securing the enclosure over a shell opening disposed in a mounting surface of a vehicle, where the interior cavity is adjacent to the shell opening after the enclosure is secured over the shell opening, and where the connector surface extends away from the mounting surface after the enclosure is secured over the shell opening. The method further includes affixing a harness to the enclosure such that an internal line of the harness passes through the shell opening to into the interior cavity of the enclosure, where, after affixing the harness, the internal line is attached to an interior portion of a connector that is disposed in the connector opening and that extends from the interior cavity through the connector surface, and affixing an external line to an exterior portion of the connector.

In some embodiments, the method further includes securing a cover to an exterior surface of at least the second side, the cover covering an access opening that is at least partly disposed in the second side. In some embodiments, the securing the cover to the exterior surface of at least the second side includes securing the cover to one or more flanges disposed at the second side. In some embodiments, the second side is a top side, the enclosure further has a third side, where the access opening extends contiguously from the top side to the third side, and, after the cover is secured, the cover extends over the top side and over the third side. In some embodiments, the connector surface is at an angle to a plane that is perpendicular to the mounting surface, where the connector surface has a first edge and a second edge, where the second edge is farther from the mounting surface than the first edge, and where the first edge is closer to the plane than the second edge. The external line has a first line portion, a second line portion, and a third line portion, and the second line portion is farther from the connector than the first line portion and is closer to the connector than the third line portion. After the external line is affixed to the connector, the second line portion is closer the mounting surface than the first line portion and the third line portion.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:
1. An enclosure comprising:
 a bottom side having a pass through opening, wherein the bottom side is configured to be mounted to a mounting surface;
 a connector surface having one or more connector openings
 a first side adjacent to the connector surface;

a second side having at least a first portion of an access opening, wherein the first side, the second side, the connector surface and the bottom side bound an interior cavity;

one or more connectors, each of the one or more connectors disposed in a respective connector opening of the one or more connector openings and extending from the interior cavity, through the connector surface; and a cover attached to an exterior surface of at least the second side, the cover covering the access opening.

2. The enclosure of claim 1, wherein the connector surface is nonparallel to a first plane that is perpendicular to the bottom side.

3. The enclosure of claim 2, wherein the connector surface is at a first angle to the first plane, wherein the connector surface has a first edge and a second edge, wherein the second edge is farther from the bottom side than the first edge, and wherein the first edge is closer to the first plane than the second edge.

4. The enclosure of claim 3, wherein the first angle is between about 3 degrees and about 10 degrees.

5. The enclosure of claim 4, wherein the first angle is about 5 degrees.

6. The enclosure of claim 1, wherein the second side is a top side.

7. The enclosure of claim 6, further comprising a third side, wherein a second portion of the access opening is disposed in the third side and is contiguous with the first portion of the access opening, and wherein the cover extends over the top side and on to the third side.

8. A rotorcraft comprising:
a mounting surface having a shell opening disposed therein;
an enclosure disposed on the mounting surface, the enclosure having a plurality of sides and further having a first connector surface extending away from the mounting surface, the plurality of sides and the first connector surface bounding an interior cavity of the enclosure disposed over the shell opening, wherein the first connector surface has a first connector opening;
a first connector disposed in the first connector opening and extending from the interior cavity through the first connector surface;
a first internal line connected to an interior portion of the first connector and extending through the shell opening; and
a first external line connected to an external portion of the first connector.

9. The rotorcraft of claim 8, wherein the first connector surface is at a first angle to a first plane that is perpendicular to the mounting surface, wherein the first connector surface has a first edge and a second edge, wherein the second edge is farther from the mounting surface than the first edge, and wherein the first edge is closer to the first plane than the second edge.

10. The rotorcraft of claim 9, wherein the first angle is between about 3 degrees and about 10 degrees.

11. The rotorcraft of claim 9, wherein the enclosure further has a second connector surface extending away from the mounting surface and bounding the interior cavity, wherein the second connector surface has a second connector opening and is separate from the first connector surface, and wherein the second connector surface faces a different direction from the first connector surface; and wherein the rotorcraft further comprises:
a second connector disposed in the second connector opening and extending from the interior cavity through the second connector surface;
a second internal line connected to an interior portion of the second connector and extending through the shell opening; and
a second external line connected to an external portion of the second connector.

12. The rotorcraft of claim 11, wherein the second connector surface is at a second angle to the first plane, wherein the second connector surface has a third edge and a fourth edge, wherein the fourth edge is farther from the mounting surface than the third edge, and wherein the third edge is closer to the first plane than the fourth edge.

13. The rotorcraft of claim 9, wherein the first external line has a first line portion, a second line portion, and a third line portion, wherein the second line portion is farther from the first connector than the first line portion and is closer to the first connector than the third line portion, and wherein the second line portion is closer the mounting surface than the first line portion and the third line portion.

14. The rotorcraft of claim 9, wherein the enclosure is a stepped enclosure and further has a second connector surface extending away from the mounting surface and bounding the interior cavity, wherein the second connector surface has a second connector opening and is separate from the first connector surface, and wherein the second connector surface faces a same direction as the first connector surface.

15. The rotorcraft of claim 8, further comprising a cover attached to the enclosure over an access opening of the enclosure that extends over two or more sides of the plurality of sides.

16. A method, comprising:
providing an enclosure having a bottom side with a pass through opening, the enclosure further having a connector surface with a connector opening, the enclosure further having a first side adjacent to the connector surface and a second side, wherein the first side, the second side, the connector surface and the bottom side bound an interior cavity of the enclosure;
securing the enclosure over a shell opening disposed in a mounting surface of a vehicle, wherein the interior cavity is adjacent to the shell opening after the enclosure is secured over the shell opening, and wherein the connector surface extends away from the mounting surface after the enclosure is secured over the shell opening;
affixing a harness to the enclosure such that an internal line of the harness passes through the shell opening to into the interior cavity of the enclosure, wherein, after affixing the harness, the internal line is attached to an interior portion of a connector that is disposed in the connector opening and that extends from the interior cavity through the connector surface; and
affixing an external line to an exterior portion of the connector.

17. The method of claim 16, further comprising securing a cover to an exterior surface of at least the second side, the cover covering an access opening that is at least partly disposed in the second side.

18. The method of claim 17, wherein the securing the cover to the exterior surface of at least the second side includes securing the cover to one or more flanges disposed at the second side.

19. The method of claim 17, wherein the second side is a top side;

wherein the enclosure further has a third side, wherein the access opening extends contiguously from the top side to the third side; and wherein, after the cover is secured, the cover extends over the top side and over the third side.

20. The method of claim 16, wherein the connector surface is at an angle to a plane that is perpendicular to the mounting surface, wherein the connector surface has a first edge and a second edge, wherein the second edge is farther from the mounting surface than the first edge, and wherein the first edge is closer to the plane than the second edge;

wherein the external line has a first line portion, a second line portion, and a third line portion, and wherein the second line portion is farther from the connector than the first line portion and is closer to the connector than the third line portion; and wherein, after the external line is affixed to the connector, the second line portion is closer the mounting surface than the first line portion and the third line portion.

\* \* \* \* \*